(12) United States Patent
Khanania

(10) Patent No.: US 8,448,568 B2
(45) Date of Patent: May 28, 2013

(54) OVEN

(75) Inventor: Souhel Khanania, Southlake, TX (US)

(73) Assignee: Souhel Khanania, Southlake, TX (US)

( * ) Notice: Subject to any disclaimer, the term of this patent is extended or adjusted under 35 U.S.C. 154(b) by 0 days.

(21) Appl. No.: 13/473,992

(22) Filed: May 17, 2012

(65) Prior Publication Data

US 2012/0222664 A1     Sep. 6, 2012

Related U.S. Application Data

(63) Continuation of application No. 12/347,321, filed on Dec. 31, 2008, now Pat. No. 8,201,493.

(60) Provisional application No. 61/018,830, filed on Jan. 3, 2008.

(51) Int. Cl.
*A47J 37/04*     (2006.01)
*A21B 1/48*     (2006.01)

(52) U.S. Cl.
USPC ..................................... 99/443 C; 126/41 C

(58) Field of Classification Search
USPC ................... 99/443 C, 443 R, 386, 326–331, 99/473–477, 468; 126/41 C, 19 R, 21 A, 126/20, 20.1
See application file for complete search history.

(56) References Cited

U.S. PATENT DOCUMENTS

| | | | | |
|---|---|---|---|---|
| 5,875,705 A | * | 3/1999 | Knost | 99/443 C |
| 6,099,882 A | * | 8/2000 | Risner et al. | 426/314 |
| 6,408,842 B1 | * | 6/2002 | Herrera | 126/41 C |
| 6,866,033 B2 | * | 3/2005 | Stacy et al. | 126/21 A |

* cited by examiner

*Primary Examiner* — Kien Nguyen
(74) *Attorney, Agent, or Firm* — Conley Rose, P.C.; J. Robert Brown, Jr.

(57) ABSTRACT

An oven has a first conveyor, a first burner that directs heat toward the first conveyor from above the first conveyor, and a second burner directs heat toward the first conveyor from below the first conveyor. A method includes providing foodstuff on a conveyor, exposing the foodstuff to heat directed toward the foodstuff from above the conveyor, and exposing the foodstuff to heat directed toward the foodstuff from below the conveyor. Another oven has a first conveyor and first conveyor insulators that surround the first conveyor and define a first zone. Another method includes introducing foodstuff to a first conveyor belt within a first insulated zone, introducing heat into the first insulated zone, and retaining a portion of the heat within the first insulated zone. Another oven has an insulated cooking zone that closely envelopes a cooking path and an insulated oven zone that substantially envelopes the cooking zone.

19 Claims, 17 Drawing Sheets

OVEN

CROSS-REFERENCE TO RELATED APPLICATIONS

This application is a continuation of U.S. patent application Ser. No. 12/347,321 filed Dec. 31, 2008, by Souhel Khanania, entitled "Oven," which claims priority to U.S. Provisional Patent Application No. 61/018,830 which was filed on Jan. 3, 2008, which are incorporated by reference herein as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Large quantities of energy are used in the manufacture of modern food products. Systems and methods that can reduce the total energy consumption of manufacturing plants that create, package, and prepare the food would be beneficial. Therefore systems and methods that provide for the efficient manufacture of food products are desirable.

SUMMARY OF THE DISCLOSURE

In some embodiments, an oven is provided that comprises a first conveyor. In that oven, a first burner directs heat toward the first conveyor from above the first conveyor and a second burner directs heat toward the first conveyor from below the first conveyor.

In other embodiments, a method is provided for cooking foodstuff that comprises providing foodstuff on a conveyor, exposing the foodstuff to heat directed toward the foodstuff from above the conveyor, and exposing the foodstuff to heat directed toward the foodstuff from below the conveyor.

In still other embodiments, an oven is provided that comprises a first conveyor. In that oven, first conveyor insulators substantially surround the first conveyor and thereby define a first zone.

In still other embodiments, a method of cooking foodstuff is provided that comprises introducing foodstuff to a first conveyor belt within a first insulated zone. The method further comprises introducing heat into the first insulated zone and retaining a portion of the heat within the first insulated zone.

In still other embodiments, an oven is provided that comprises a substantially insulated cooking zone that closely envelopes a cooking path and a substantially insulated oven zone that substantially envelopes the cooking zone.

The various characteristics described above, as well as other features, will be readily apparent to those skilled in the art upon reading the following detailed description of the embodiments of the disclosure, and by referring to the accompanying drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
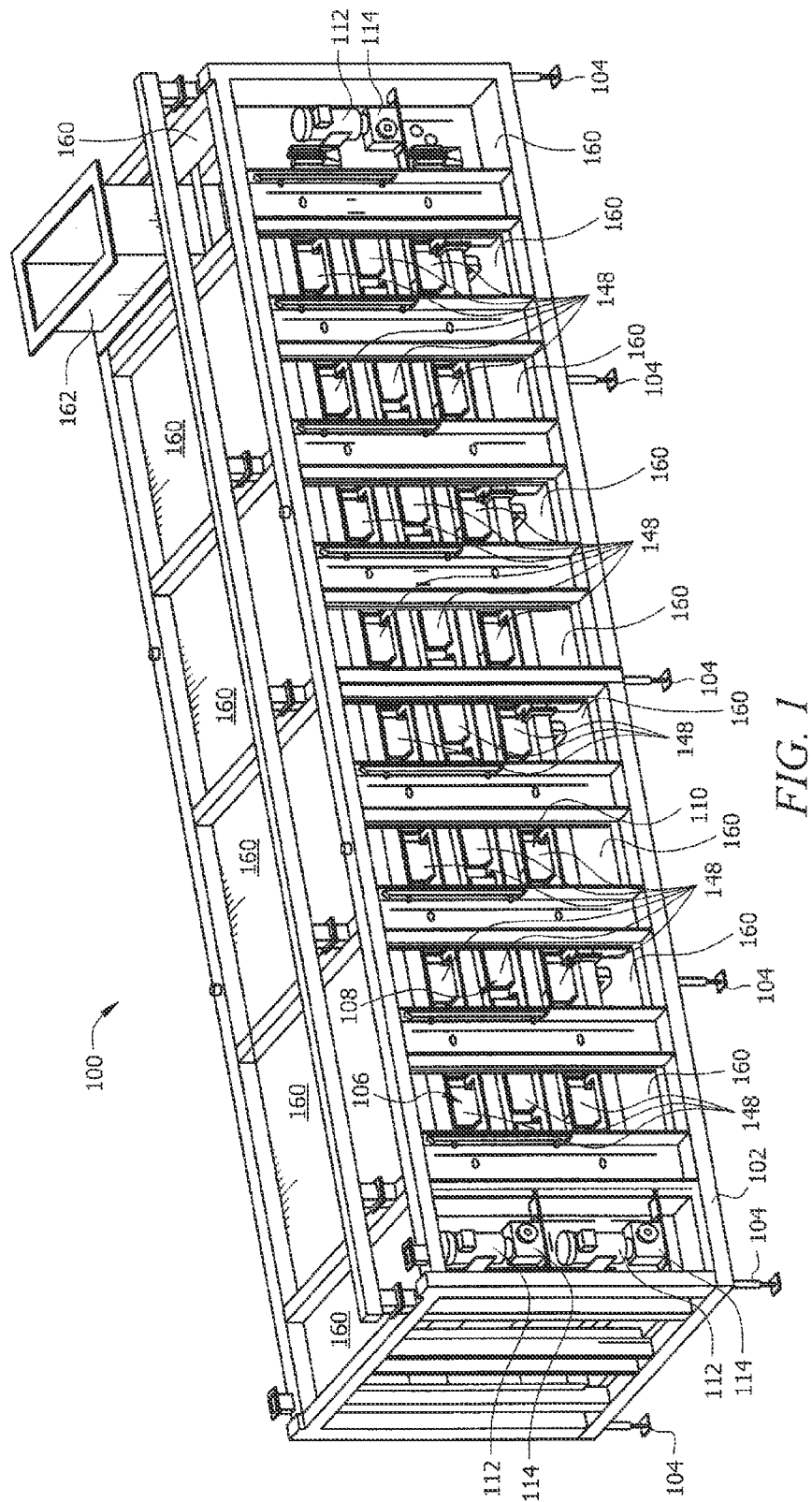
FIG. 1 is an oblique view of an oven according to the present disclosure.
Figure 2:
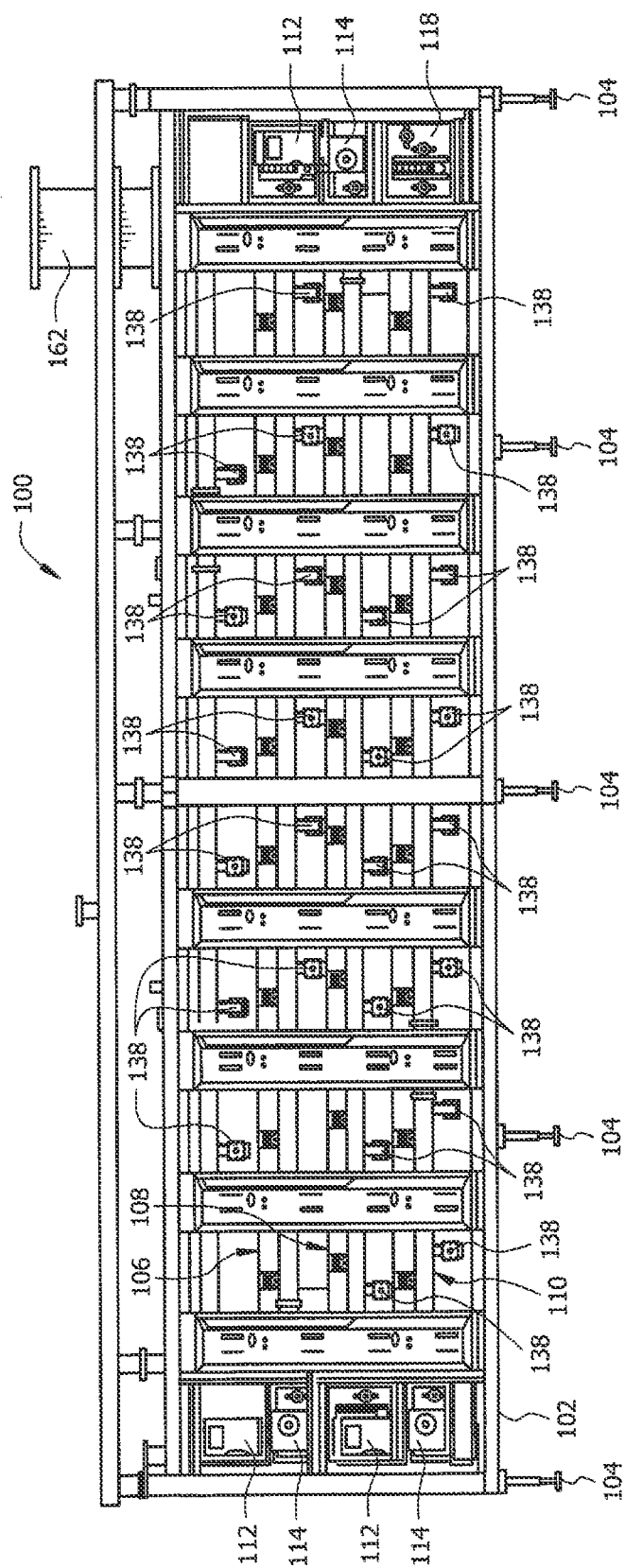
FIG. 2 is a front view of the oven of FIG. 1.
Figure 3:
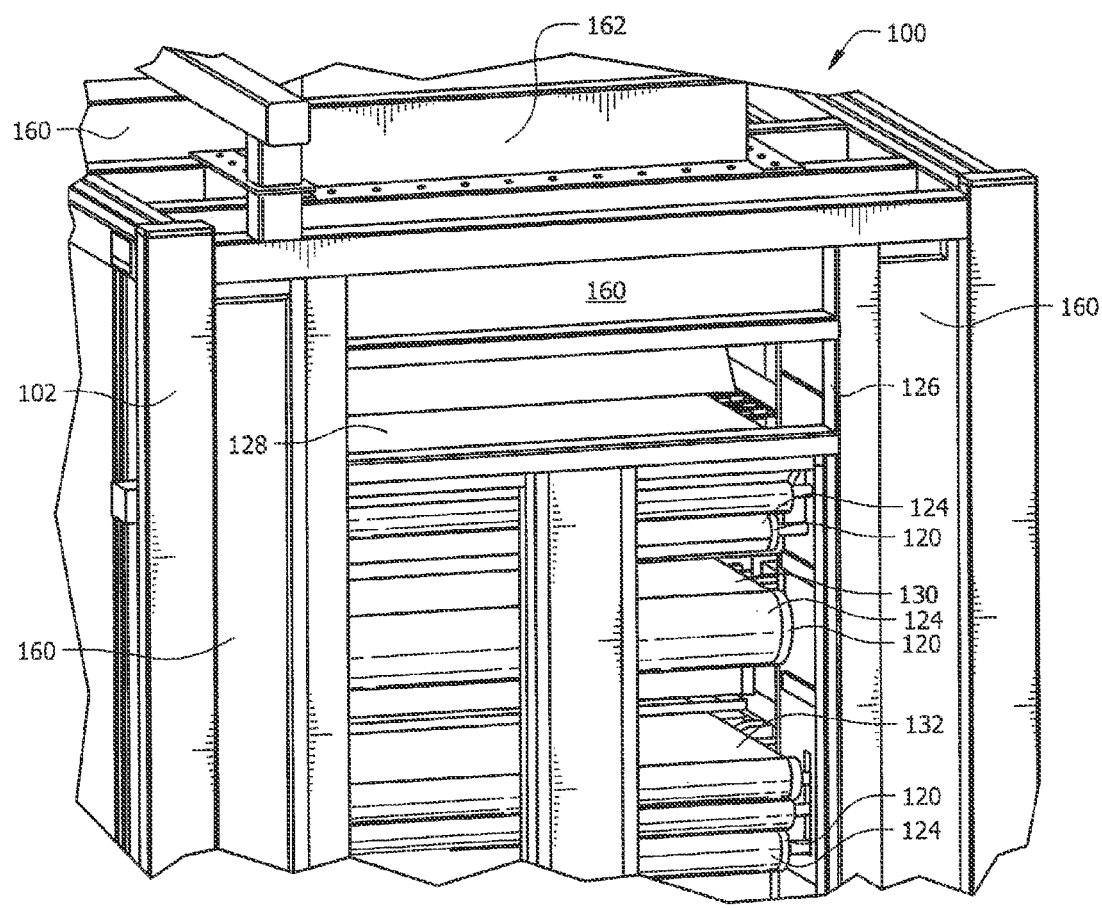
FIG. 3 is an enlarged oblique view of a portion of the upper right side of the oven of FIG. 1.
Figure 4:
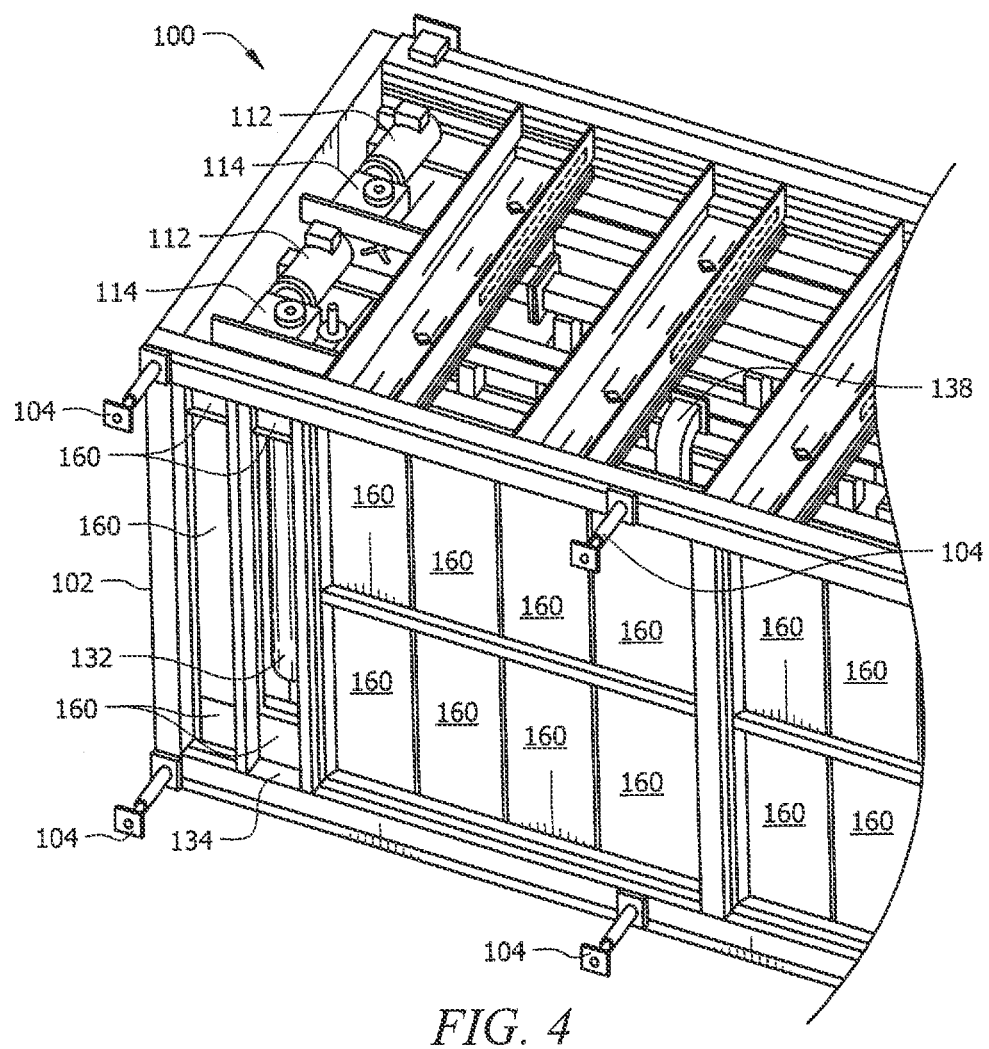
FIG. 4 is an enlarged oblique view of a portion of the lower left side of the oven of FIG. 1.

In the preparation of food materials, such as, but not limited to, potato, corn and tortilla chips, cooking the foodstuff sometimes consumes large quantities of energy. Conventional industrial ovens lose a significant amount of heat and energy due to poor design and/or a lack of insulation. Systems and methods that could improve on the efficiency of ovens would greatly reduce the overall energy required to manufacture foodstuff. Accordingly, the present disclosure discloses systems and methods that may be implemented to reduce energy consumption in the process of cooking foodstuff.

Typical ovens comprise large enclosures having multiple conveyors within the enclosures. Sometimes the multiple conveyors work together to form a path along which foodstuff successively travels from one conveyor to the next. However, the typical ovens require that the entire enclosure be heated in order to cook foodstuff on the conveyors, thereby unnecessarily heating the contents of space that is not in close proximity or adjacent to the foodstuff. The unnecessary heating of the contents of a large volume of space accounts for a large amount of energy consumption and waste, rendering the cooking process unnecessarily energy inefficient.

The present disclosure provides for substantially enclosing each conveyor within substantially adjacent insulative barriers that generally serve to envelope the conveyors individually within zones. The present disclosure further discloses providing insulated ducts for connecting the various zones that relate to the conveyors so that heat is efficiently transferred between the various zones. The present disclosure provides a cooking zone that comprises the zones that are individually related to the conveyors and further comprises the insulated ducts that join the various zones. Generally, the insulative barriers serve to retain heat within the cooking zone, thereby allowing more efficient cooking of foodstuff within the cooking zone. The present disclosure further provides gas-fueled infrared burners positioned to emit and direct heat toward one or more conveyors from both above the conveyors and from below the conveyors. Still further, the present disclosure provides enclosing the cooking zone within an oven zone that substantially envelops the entirety of the cooking zone so that heat loss from the cooking zone is reduced. While every combination is not discussed, the present disclosure expressly contemplates combining the disclosed features in many combinations. For example, an oven according to the disclosure may comprise one or more conveyors that are enclosed by insulative barriers and one or more of those conveyors may have infrared burners associated with the conveyor to emit and direct heat on the conveyor from both above and below the conveyors.

Referring now to FIGS. 1-4, an oven 100 is disclosed. Oven 100 comprises a supportive frame 102 having a plurality of structural components, only some of which are described in greater detail below. The frame 102 is supported by feet 104 attached to the bottom of the frame 102. The oven has a left side shown generally leftward in FIG. 2 and a right side shown generally rightward in FIG. 2. Further, the oven 100 has a front side that is displayed generally between the left and right sides in FIG. 2. Accordingly, the oven 100 comprises a top side opposite the bottom side and a rear side opposite the front side. It will be appreciated that the above directional conventions apply throughout the description of oven 100.

Most generally, the oven 100 comprises an upper conveyor system 106, a middle conveyer system 108, and a lower conveyor system 110. Each of the conveyor systems 106, 108, 110 comprise the necessary equipment for operation of each conveyor system 106, 108, 110 independent of the others. In the preferred embodiment, each conveyor system 106, 108, 110 comprises its own motor 112, gearbox 114, drive shaft 116, and belt tensioners 118. It will be appreciated that in other embodiments, a single motor may be used to power one or more conveyors. Each conveyor system 106, 108, 110 further comprises the necessary drive drums 120, tensioner drums 122, and free drums 124 to carry conveyor belts. The conveyor systems 106, 108, 110, together, generally define a cooking path along which foodstuff is carried and cooked while present on the cooking path.

At an entrance 126 formed by the frame 102 (most clearly shown in FIG. 3), foodstuff may be introduced to an upper surface of an upper belt 128. The upper conveyor system 106 operates to rotate upper belt 128 in a generally counterclockwise direction as viewed in FIG. 2 so that the upper surface of upper belt 128 moves from right to left. Middle conveyor system 108 is located generally below upper conveyor system 106 so that as foodstuff reaches the left end of the upper belt 128, the foodstuff falls from the upper belt 128 to an upper surface of a middle belt 130 of middle conveyor system 108. The middle conveyor system 108 operates to rotate middle belt 130 in a generally clockwise direction as viewed in FIG. 2 so that the upper surface of middle belt 130 moves from left to right.

Lower conveyor system 110 is located generally below middle conveyor system 108 so that as foodstuff reaches the right end of the middle belt 130, the foodstuff falls from the middle belt 130 to an upper surface of a lower belt 132 of lower conveyor system 110. The lower conveyor system 110 operates to rotate lower belt 132 in a counterclockwise direction as viewed in FIG. 2 so that the upper surface of lower belt 132 moves from right to left. As foodstuff reaches the left end of the lower belt 132 the foodstuff is free to fall from lower belt 132 down through an exit 134 formed generally by the frame 102 (most clearly shown in FIG. 4). In some embodiments the oven 100 may be associated with other foodstuff preparation and/or packaging equipment so that once foodstuff passes through exit 134 the foodstuff is collected and further processed and/or packaged. It will be appreciated that, in this embodiment, the cooking path of foodstuff is defined as the path along which foodstuff travels within the oven 100 (i.e. along the conveyor belts 128, 130, 132 as described above).

The cooking path is more than a path along which foodstuff is moved. The cooking path is a path along which foodstuff is cooked by exposure to high temperatures through various forms of heat transfer as discussed below. In this embodiment, each conveyor system 106, 108, 110 has a plurality of gas fueled infrared burners 136 (see FIGS. 5 and 12) (hereinafter referred to as "IR burners") associated therewith. The IR burners 136 are fed a mixture of air and fuel gas through mixers 138 that are described in greater detail below (see FIG. 11). While IR burners 136 are not shown in FIGS. 1-4, it will be appreciated that one IR burner 136 is associated with each mixer 138. As described in more detail below, each IR burner 136 is capable of directing radiant heat in a directional manner.

Figure 5:
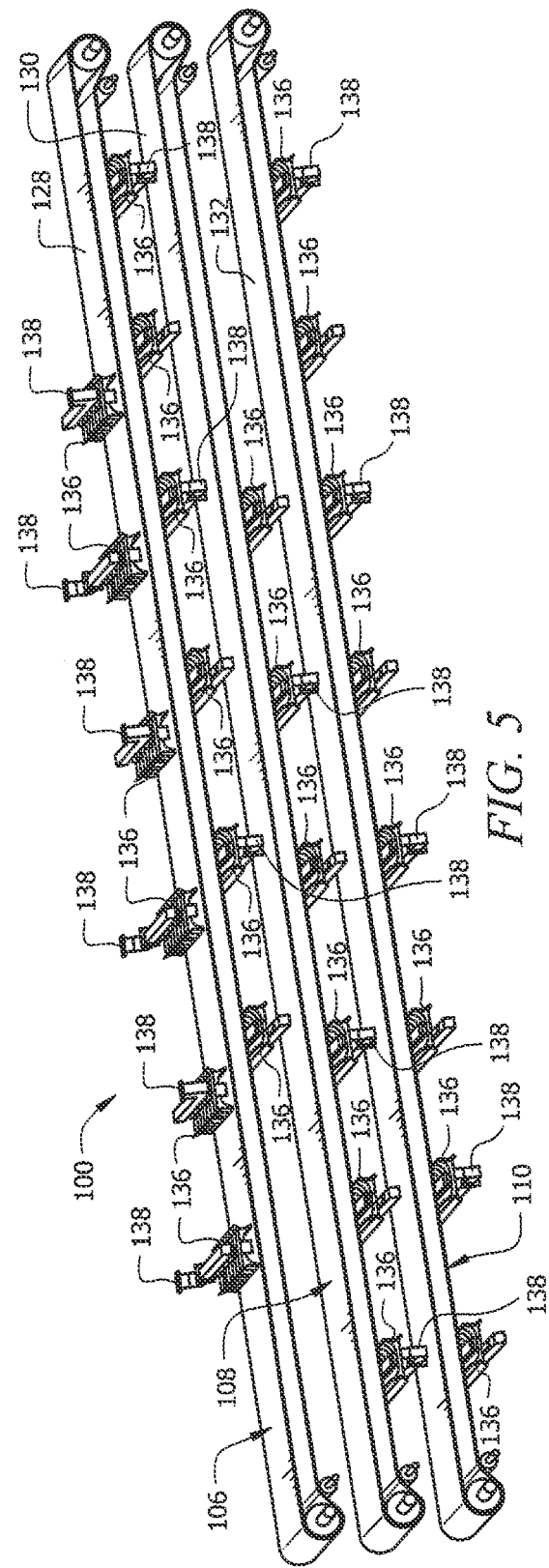
FIG. 5 is an oblique view of the belts and IR burners of the oven of FIG. 1.
Figure 6:
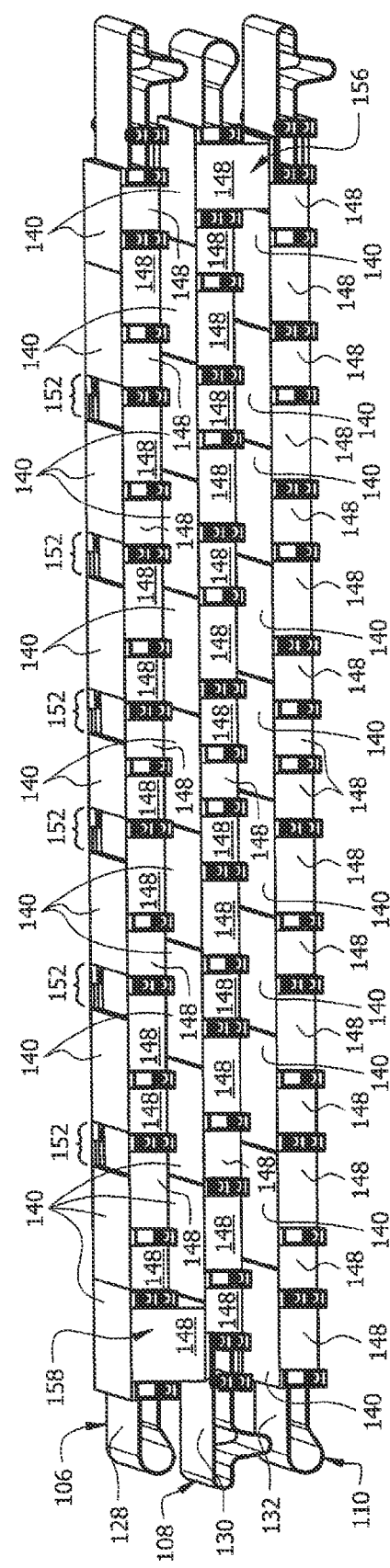
FIG. 6 is an upper oblique view of the belts and cooking zone of the oven of FIG. 1.
Figure 7:
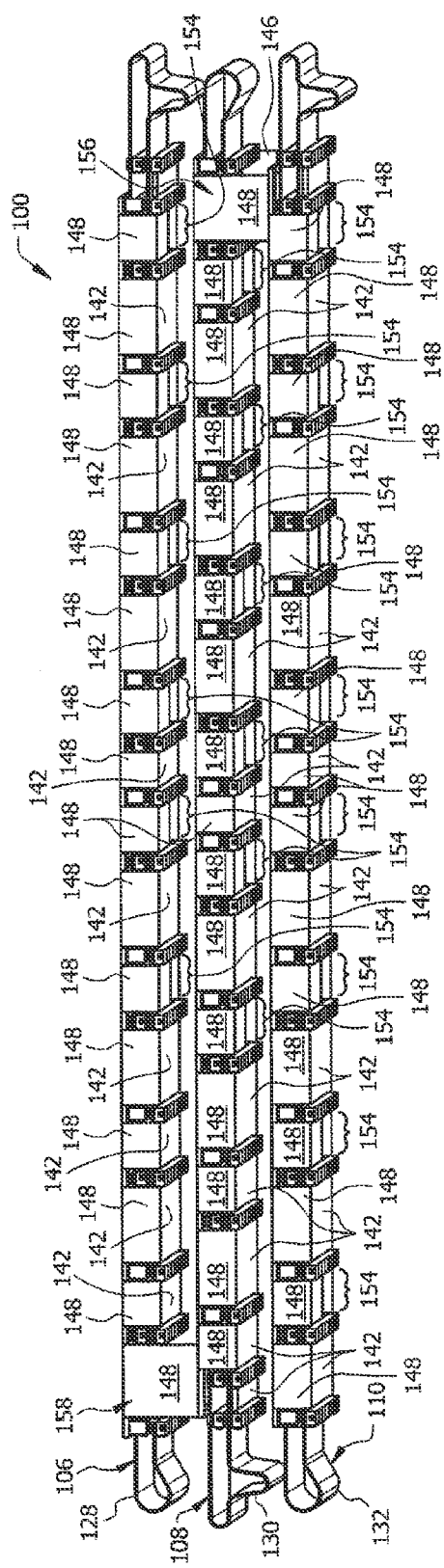
FIG. 7 is a lower oblique view of the belts and cooking zone of the oven of FIG. 1.
Figure 8:
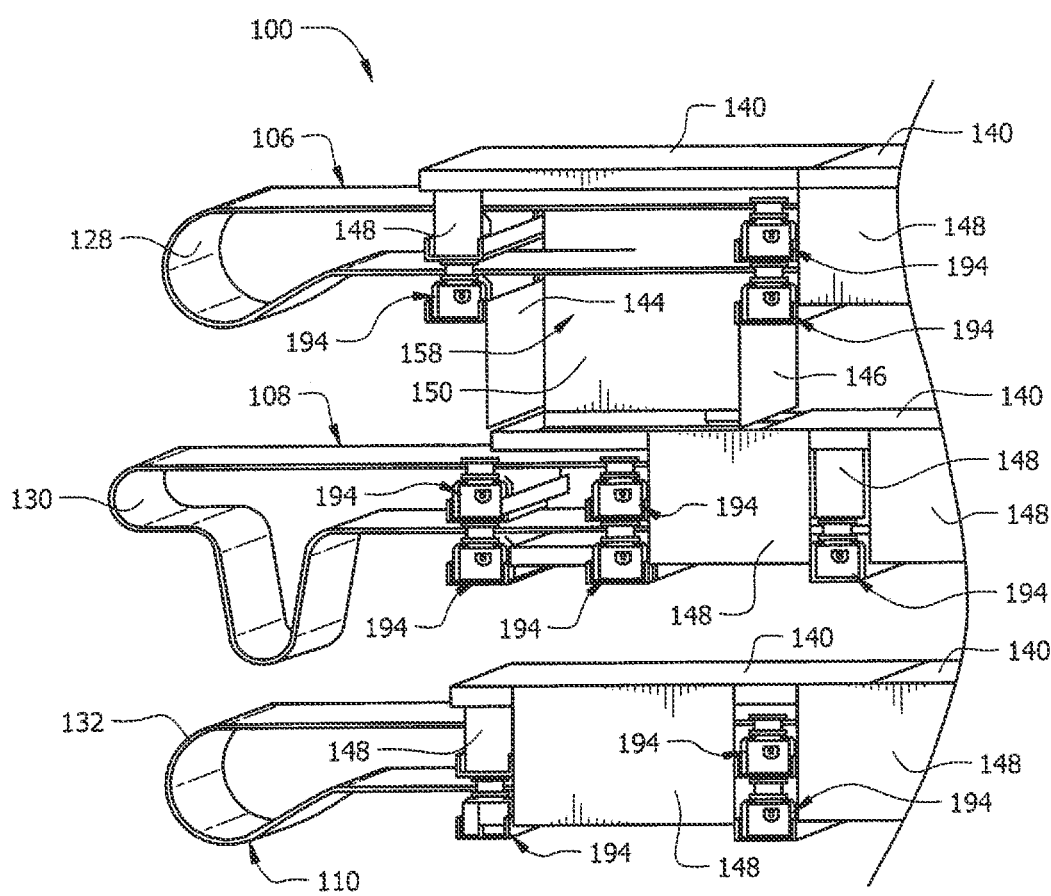
FIG. 8 is an enlarged oblique view of the left side of the belts and cooking zone of the oven of FIG. 1.
Figure 9:
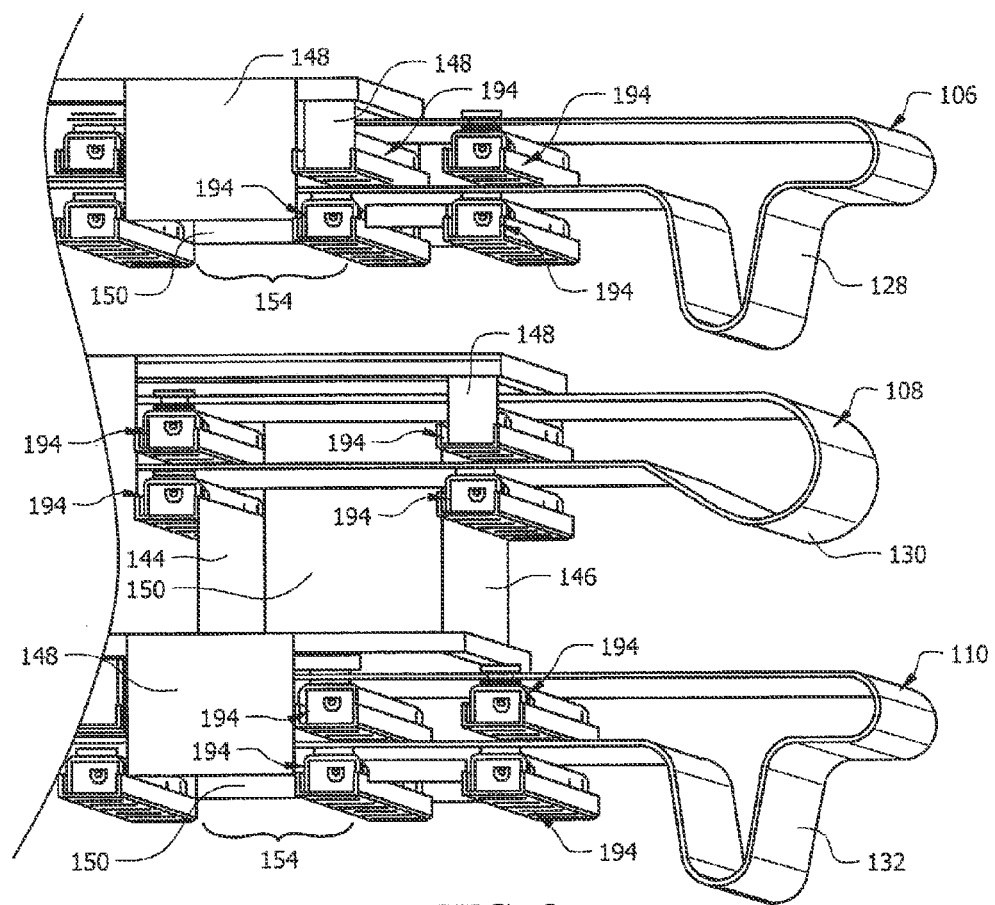
FIG. 9 is an enlarged oblique view of the right side of the belts and cooking zone of the oven of FIG. 1.

Referring now to FIG. 5, the upper, middle, and lower belts 128, 130, and 132 are shown along with the IR burners 136, but without the remainder of the components of the oven 100. In this embodiment, the upper belt 128 is associated with six IR burners 136 that are located slightly above the upper belt 128 and that are oriented to emit radiant heat downward onto upper belt 128. The upper belt 128 is further associated with six IR burners 136 that are located slightly below the upper belt 128 and that are oriented to emit radiant heat upward onto upper belt 128. Similarly, middle belt 130 is associated with six IR burners 136 that are located slightly below the middle belt 130 and that are oriented to emit radiant heat upward onto middle belt 130. Finally, lower belt 132 is associated with eight IR burners 136 that are located slightly below the lower belt 132 and that are oriented to emit radiant heat upward onto the lower belt 132. Of course, in alternative embodiments, an upper belt may comprise IR burners only above or below the upper belt, a middle belt may comprise IR burners both above and below the middle belt or may comprise IR burners only above the middle belt, and a lower belt may comprise IR burners both above and below the middle belt or may comprise IR burners only above the lower belt. Also, burners other than IR burners may be used or used in combination with IR burners.

A feature of the oven 100 is that heat generated by IR burners 136 is not merely cast upon the belts 128, 130, 132 and easily allowed to pass into the general interior space of the oven 100 (where the interior space is generally defined by the left, right, bottom, top, front, and rear of the oven 100), but rather, the heat is retained near the foodstuff. Specifically, the oven 100 is constructed in a manner that substantially encloses the cooking path in a minimal envelope of space, thereby retaining the heat generated by the IR burners 136 in space near the foodstuff that is carried along the cooking path. Most generally, the heat is retained by constructing insulative barriers to prevent the escape of heat so that the cooking path (i.e. each conveyor belt 128, 130, 132) is substantially enclosed within an insulated cooking zone.

Referring now to FIGS. 6-9, the insulated cooking zone is defined generally as a substantially contiguous space that is substantially bounded by insulation in close proximity to the cooking path. In this embodiment, an upper zone substantially surrounds the upper belt 128 and is defined generally by the space bounded by upper insulators 140, lower insulators 142, left insulators 144, right insulators 146, front insulators 148, and rear insulators 150. The various insulators 140, 142, 144, 146, 148, 150 are generally plate-like in shape and serve to closely bound the belts 128, 130, 132 while being sized and/or otherwise shaped to accommodate protrusions of other portions of the oven 100 as necessary. In keeping with the goal of substantially enclosing the cooking path within a cooking zone, the insulators 140, 142, 144, 146, 148, 150 generally form substantially continuous walls around the belts 128, 130, 132. However, upper burner openings 152 and lower burner openings 154 are present to allow a passage for radiant heat to enter the cooking zone from IR burners 136. The insulators 140, 142, 144, 146, 148, 150 also form a middle zone that substantially surrounds the middle belt 130 and a lower zone that substantially surrounds the lower belt 132.

It will further be appreciated that the upper, middle, and lower zones are connected to generally form the single cooking zone. Specifically, the insulators 140, 142, 144, 146, 148, 150 form a right duct 156 that generally connects the right side of the lower zone to the right side of the middle zone. The insulators 140, 142, 144, 146, 148, 150 also generally form a left duct 158 that generally connects the left side of the middle zone to the left side of the upper zone. The joint nature of the lower, middle, and upper zones allow heat and hot air to travel in a directed manner from left to right in the lower zone, up through the right duct 156, from right to left in the middle zone, up through the left duct 158, and finally from left to right in the upper zone. The heat and hot air in the cooking zone generally travels along a path opposite in direction to the direction the foodstuff is carried along the cooking path.

By directing the heat and hot air in the manner described above, the heat generated by IR burners 136 associated with the lower belt 132 that is not absorbed by foodstuff on the lower belt 132 is not lost. Instead, the unabsorbed heat encounters foodstuff along the entire length of the cooking path until the heat is ultimately fully absorbed by foodstuff along the cooking path or the heat exits the cooking zone near the right side of the upper zone. It will be appreciated that front insulators 148 that aid in forming the right duct 156 and left duct 158 are omitted from view in FIGS. 8 and 9 to allow a view inside the right duct 156 and the left duct 158.

Referring again to FIGS. 1-4, the oven 100 further comprises an insulated oven zone that is generally defined by outer insulators 160 that bound the oven zone. The oven zone substantially envelopes the cooking zone so that any heat escaping the cooking zone within the oven 100 is retained within the oven zone. It will be appreciated that while outer insulators 160 are mostly shown as being associated with the top and bottom sides of the oven 100, outer insulators 160 associated with the right, left, front, and rear sides of the oven 100 are expressly contemplated by this disclosure. Some outer insulators 160 associated with the right, left, front, and rear sides of the oven 100 are not shown in order to provide clarity in view the other components of the oven 100.

The effect of providing an insulated oven zone is that temperature gradients at the interface of the cooking zone and the oven zone are less than what the temperature gradients would be between the cooking zone and an otherwise existing adjacent ambient zone. Since the temperature gradient between the cooking zone and the next adjacent zone is lessened, a lower amount of heat transfer will occur between the cooking zone and the next adjacent zone. In other words, with the provision of the oven zone, heat will tend to transfer away from the cooking zone at a reduced rate. Further, an exhaust heat duct 160 is provided that is shown as a substantially rectangular structure and that connects the oven zone to another space. In some embodiments, the exhaust heat duct 162 may direct exhaust heat to the exterior of a building that houses the oven 100. In other embodiments, the exhaust heat duct 162 may direct heat to another device or zone to allow recapture and/or reuse of the exhausted heat.

Figure 10:
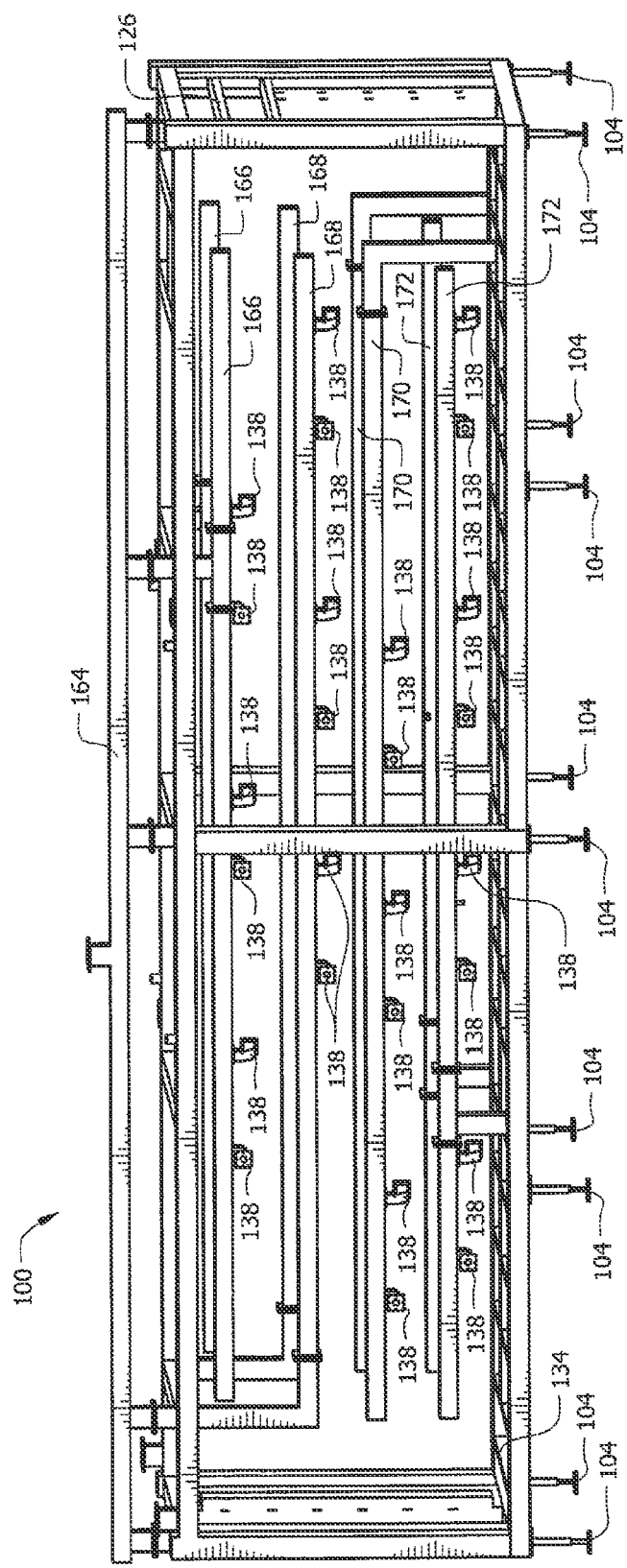
FIG. 10 is a front oblique view the frame and air delivery system of the oven of FIG. 1.

Referring now to FIG. 10, a simplified view of the frame 102 is shown to illustrate that the frame 102 serves not only as a structural support system, but also as an air delivery system. Specifically, frame 102 comprises an air input manifold 164 that supplies air to top burner upper manifolds 166 that supply air to IR burners 136 that direct heat downward onto upper belt 128. Similarly, frame 102 comprises supply air to bottom burner upper manifolds 168 that supply air to IR burners 136 that direct heat upward onto upper belt 128. Further, frame 102 comprises middle manifolds 170 that supply air to the IR burners 136 that direct heat upward onto middle belt 130. Finally, frame 102 comprises lower manifolds 172 that supply air to the IR burners 136 that direct heat upward onto lower belt 132. Each manifold 166, 168, 170, 172 has a plurality of mixers 138 attached thereto and the mixers 138 serve as outlets for air supplied through the manifolds 166, 168, 170, 172.

Figure 11:
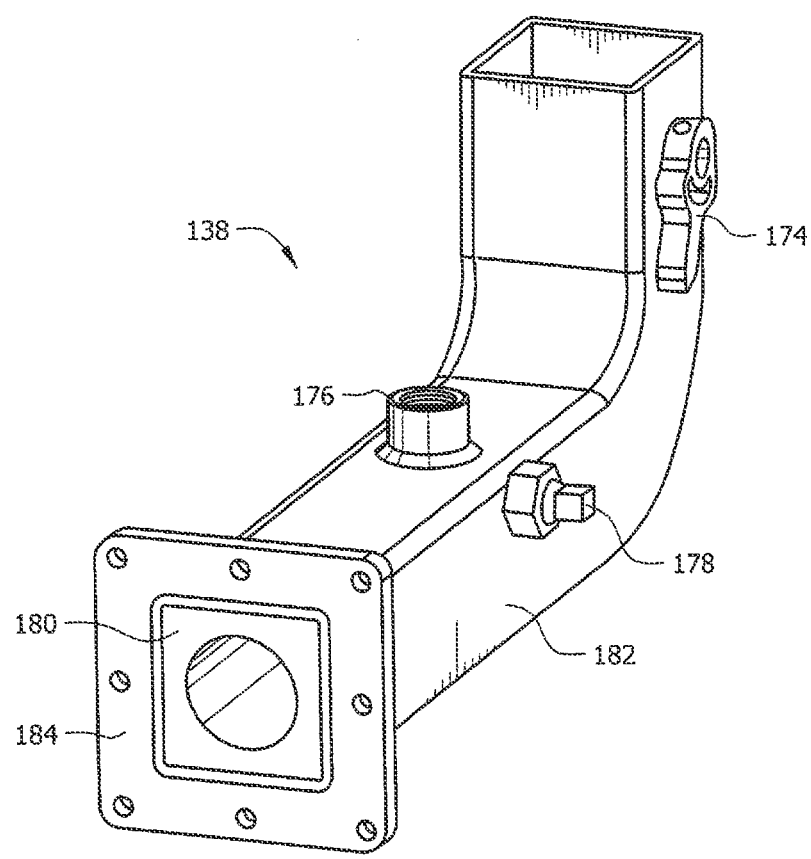
FIG. 11 is an oblique view of a mixer of the oven of FIG. 1.

Referring now to FIG. 11, a mixer 138 is shown. The mixer 138 comprises a latch 174 for securing mixer 138 to one of the previously described manifolds 166, 168, 170, 172. The mixer 138 further comprises a gas inlet 176 for attachment to a gas supply line. The mixer 138 also comprises a gas adjustment 178 that functions to alter the flow rate of fuel gas into the mixer 138 through the gas inlet 176, thereby providing a convenient way to adjust a gas-air mixture that exits a mixer insert 180. Mixer insert 180 is shaped to provide improved mixing of the air and gas as compared to the mixing of the air and gas that would otherwise occur in the tubing-shaped body 182 of the mixer 138. The mixer 138 further comprises a mounting plate 184 for attachment to a burner manifold.

Figure 12:
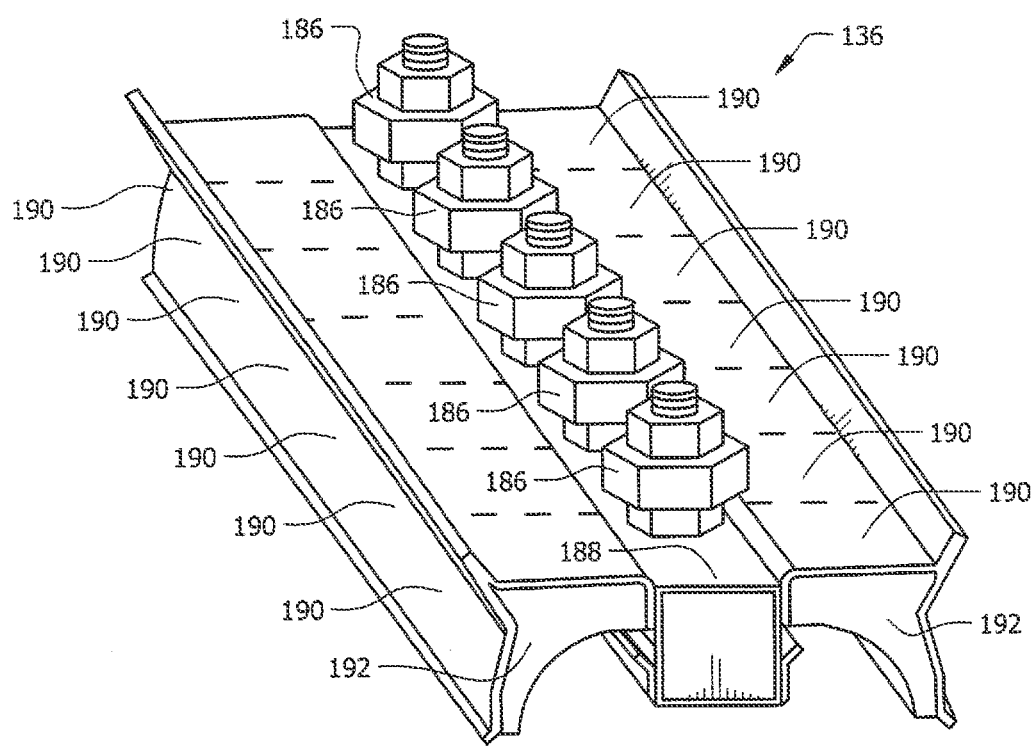
FIG. 12 is an oblique view of an IR burner of the oven of FIG. 1.

Referring now to FIG. 12, an IR burner 136 is shown in greater detail. The IR burner 136 comprises a plurality of mixture inputs 186 that distribute the gas-air mixture along the length of a burner tube 188. The IR burner 136 further comprises forms 190 that serve to hold ceramic reflector-emitters 192. The reflector-emitters 192 serve the dual role of reflecting radiant heat in a concentrated manner in a direction generally away from the forms 190 while also becoming heated to emit infrared radiation. The emitted infrared radiation serves to heat foodstuff and the components that carry foodstuff along the cooking path.

Figure 13:
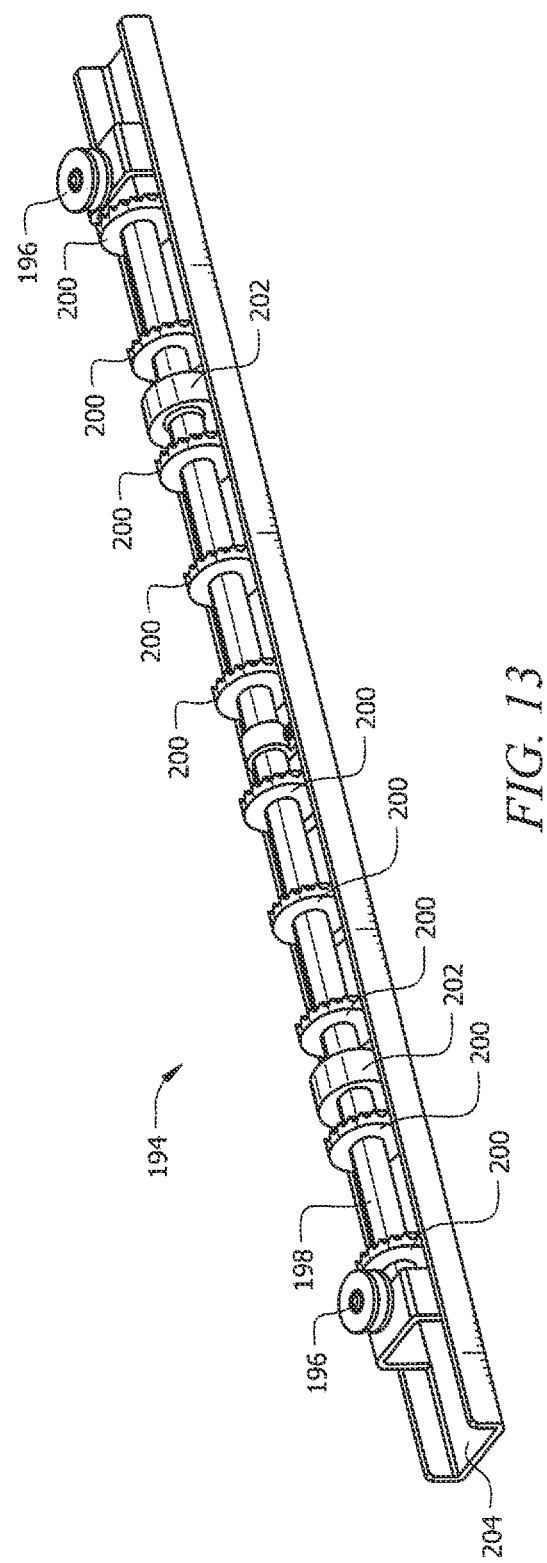
FIG. 13 is an oblique upper view of a belt guide of the oven of FIG. 1.

Referring now to FIG. 13, a belt guide 194 is shown. A plurality of belt guides 194 are used in oven 100 to maintain a front-to-back alignment of the belts 128, 130, 132. To keep the belts 128, 130, 132 aligned from front to back, the belts 128, 130, 132 are guided between side pulleys 196 that oppose the front and rear sides of the belts 128, 130, 132. To keep the belts 128, 130, 132 generally flat where appropriate, a support shaft 198 is provided with support gears 200 and support bearings 202. The support shaft turns freely due to the support bearings 202 while the support gears 200 actually engage and vertically support the belts 128, 130, 132. The support gears 200 have a larger diameter than the support bearings 202. The components of the belt guide 194 are all commonly carried by a support bar 204 that is in turn supported by other structures of the oven 100.

Figure 14:
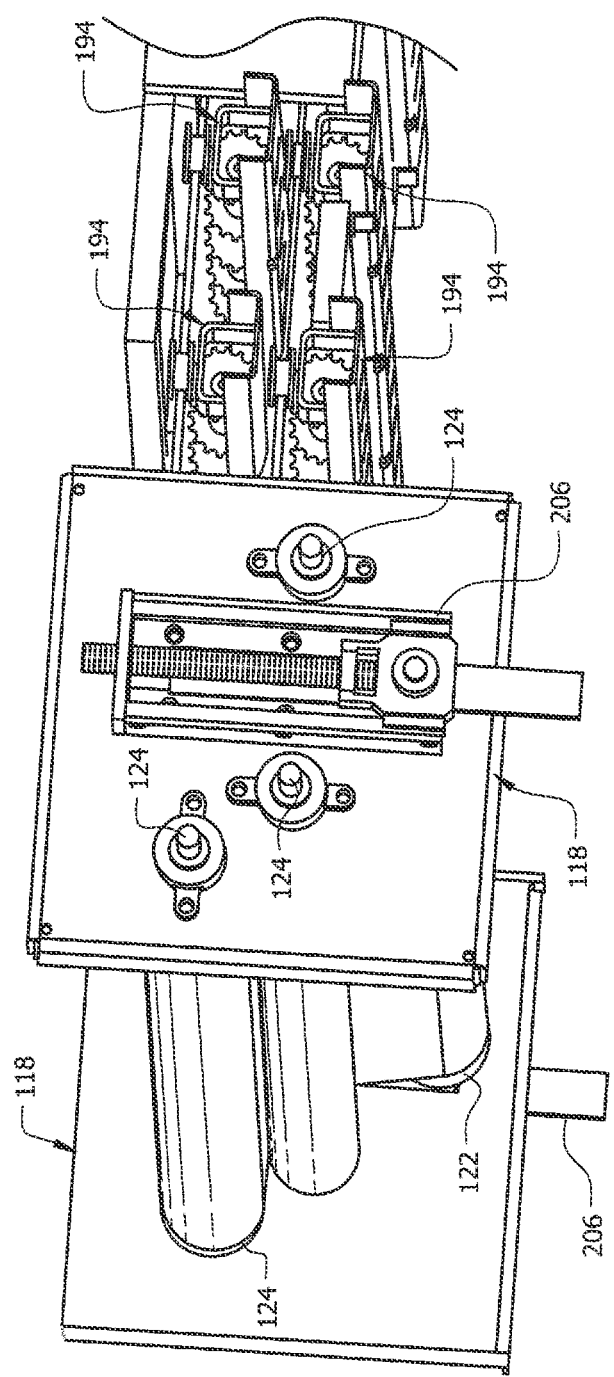
FIG. 14 is an oblique front view of two belt tensioners of the oven of FIG. 1.

Referring now to FIG. 14, belt tensioners 118 are shown that serve to provide a convenient adjustment to the tension of belts 128, 130, 132. The belt tensioner 118 comprises an adjustable shaft mount 206 that allows upward or downward movement of tensioner drum 122. As tensioner drum 122 is moved up, the tension of the belt is decreased. As the tensioner drum 122 is moved down, the tension of the belt is increased.

Figure 15:
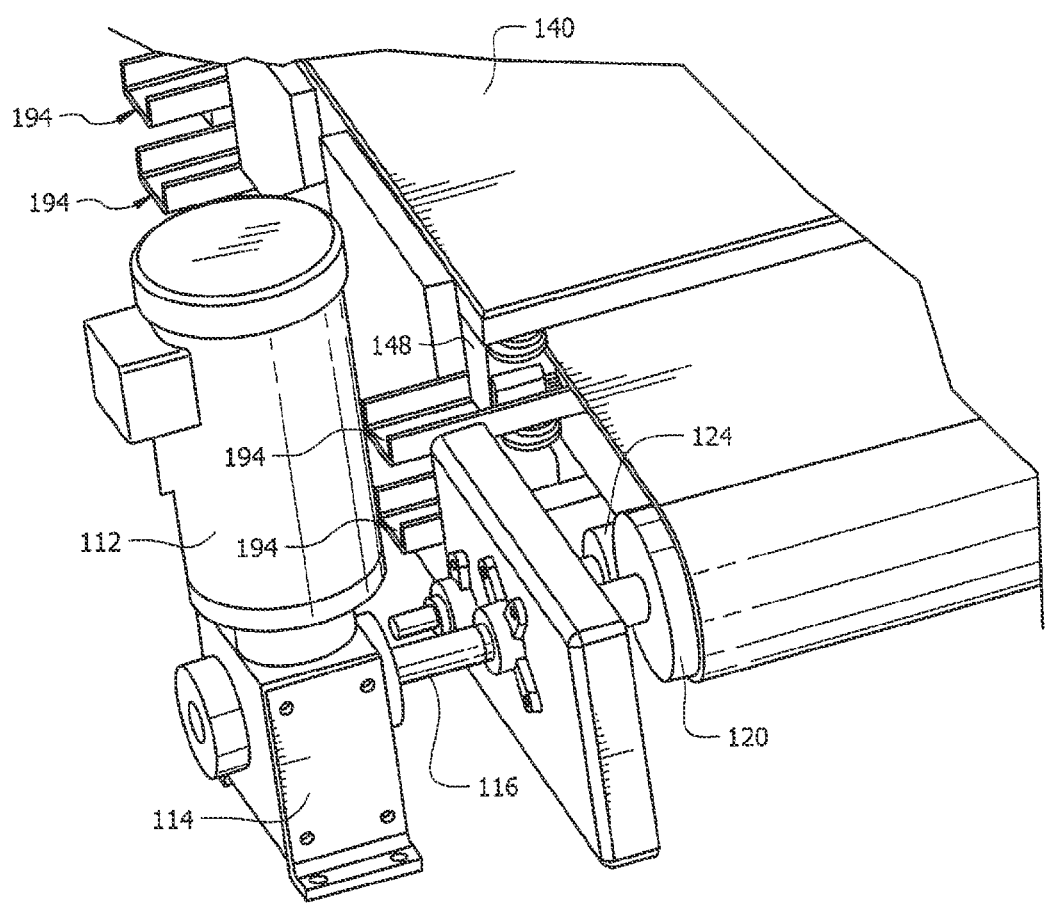
FIG. 15 is an oblique view of a motor, gearbox, and drive shaft of the oven of FIG. 1.

Referring now to FIG. 15, an enlarged view of a motor 112, gearbox 114, and drive shaft 116 are shown in association with a drive drum 120 and a belt. Motor 112 is an electric motor, however, in alternative embodiments, the motor may be a pneumatic motor, hydraulic motor, or any other suitable motor. The motor 112 is connected to a gearbox 114 which is in turn connected to a drive shaft 116 that drives the drive drum 120. When the drive drum 120 is rotated, the belt is moved.

Figure 16:
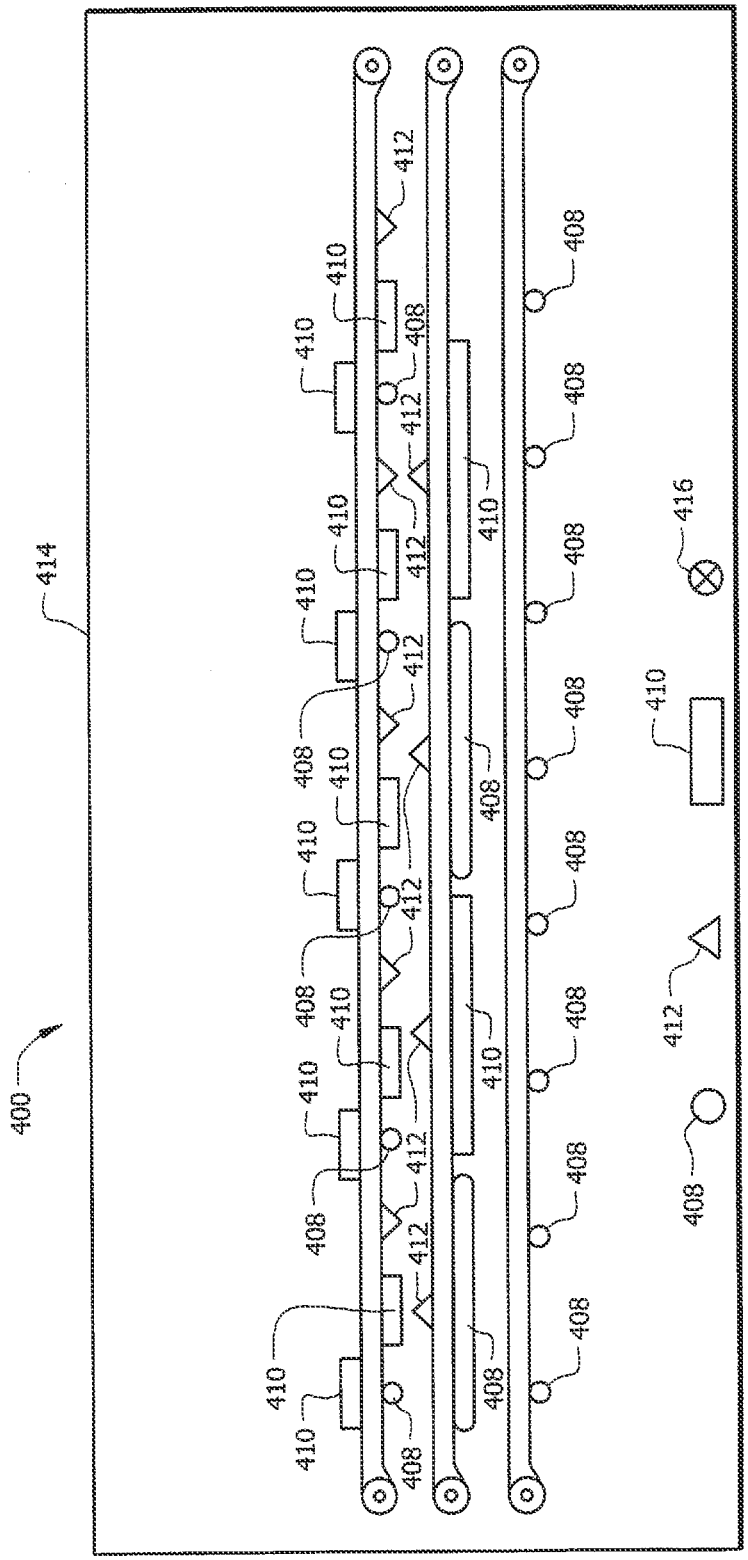
FIG. 16 is a simplified front view of another oven according to the present disclosure.

Referring now to FIG. 16, an alternative embodiment of an oven 400 is shown in simplified form. Oven 400 is substantially similar to oven 100 but for the choice of heat generators. Specifically, oven 400 comprises an upper belt 402, a middle belt 404, and a lower belt 406 that are connected and insulated to have a cooking zone substantially similar to the cooking zone of oven 100. Oven 400 comprises a combination of slit-tube gas burners 408, IR burners 410, and microwave emitters 412. Further, it will be appreciated that the slit-tube gas burners 408 and IR burners 410 associated with the middle belt 404 are oriented lengthwise with the middle belt 404. However, the slit-tube gas burners 408 and IR burners 410 associated with the upper belt 402 are oriented generally across the upper belt 402 from front to back. Further, an oven zone 414 comprises a slit-tube gas burner 408, an IR burner 410, and a microwave emitter 412 within the oven zone 414 but outside the cooking zone. The oven zone 414 further comprises a forced air fan 416 for circulating air in the oven zone 414. Of course, in alternative embodiments, the types of heat generators, the placement of the heat generators 408, 410, 412 and fans 416 may be different than shown and the various combinations of components and component placements may be used in combination with other embodiments disclosed herein.

Figure 17:
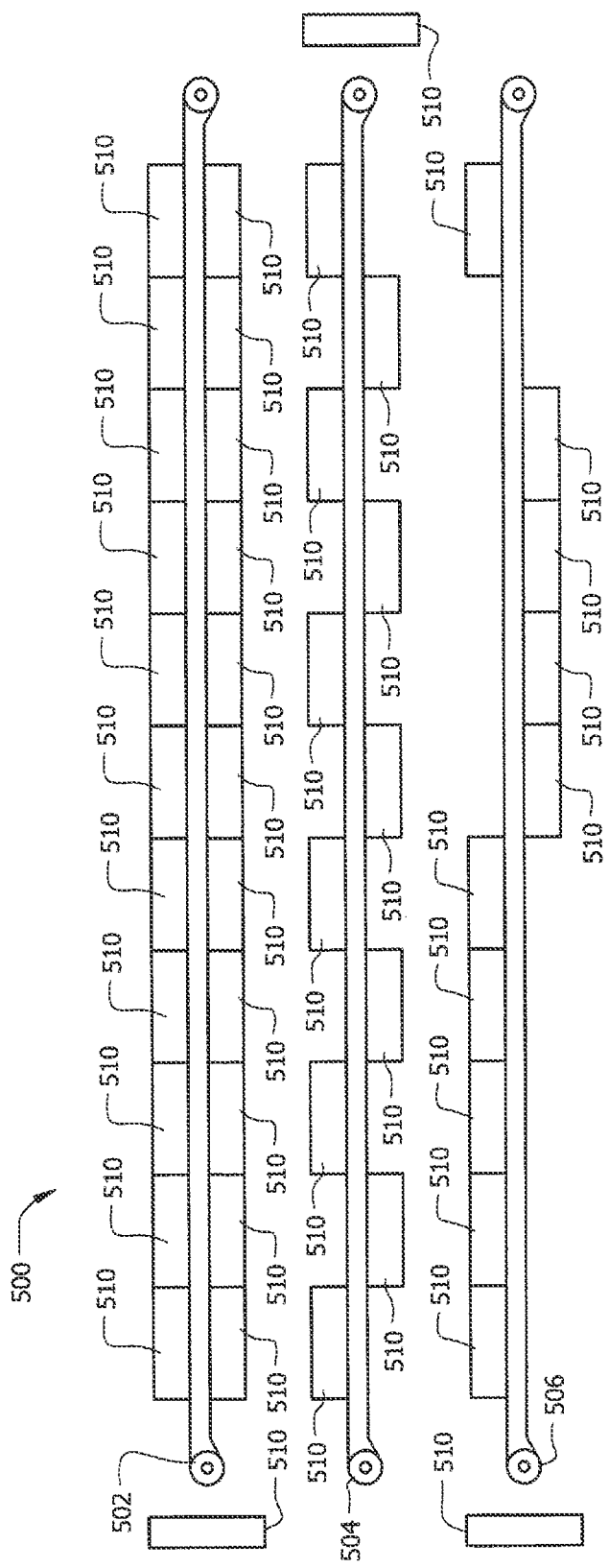
FIG. 17 is a simplified front view of still another oven according to the present disclosure.

Referring now to FIG. 17, an alternative embodiment of an oven 500 is shown in simplified form. Oven 500 is substantially similar to oven 100 but for the placement of heat generators. Specifically, oven 500 comprises an upper belt 502, a middle belt 504, and a lower belt 506 that are connected and insulated to have a cooking zone substantially similar to the cooking zone of oven 100. Oven 500 comprises IR burners 510. IR burners 510 are placed continuously along both the top and bottom side of upper belt 502. IR burners 510 are alternatingly placed along the middle belt 504 so that there is no overlap in IR burners 510 but also so that foodstuff is always directly above or directly below an IR burner 510 while on middle belt 504. IR burners 510 are also placed substantially adjacent one another to form a series of adjacent IR burners 510 on the upper left side of the lower belt 506. However, another series of adjacent IR burners 510 is located just to the right of the upper left series of IR burners 510 on the bottom side of the lower belt 506. Another IR burner 510 is located near the right end of the lower belt 506 on the upper side of the lower belt 506 and is offset to the right from any IR burners 506 on the lower belt 506. Finally, IR burners 510 are placed facing the left end of the upper belt 502, the right end of the middle belt 504, and the left end of the lower belt 506. Further, it will be appreciated that while IR burners 510 are discussed in the particular layouts described above, in alternative embodiments, IR burners may be positioned along conveyor belts and positioned relative to each other in any other suitable manner.

It will be appreciated that any of the insulators 140, 142, 144, 146, 148, 150, 160 may be constructed of stainless steel, Stainless Steel 253 MA™, high nickel steel, Rockwool™ materials, or any other suitable material. The insulators may be placed in relative close proximity to conveyor belts in such a way to maximize heat retention in the cooking zone (i.e. near the belts). It will further be appreciated that one advantage of the of using the IR burners 136 is that the effective cooking area of the IR burners 136 is essentially the footprint of the reflector-emitters 192 as compared to the effective cooking area of a gas flame being only the area of the gas flame. It will further be appreciated that while ovens 100, 400, and 500 are disclosed as having three conveyor belts (i.e. a three-pass system), the principles disclosed herein can be equally applied to any oven having one, two, three, or more such conveyor systems. Specifically, for example, an oven may comprise a single conveyor within an insulated cooking zone where the cooking zone is further substantially enveloped within an insulated oven zone.

Further, in alternative embodiments, an oven may comprise multiple conveyor belts at or near the same vertical level so that foodstuff is not dropped from one belt to another. Still further, in alternative embodiments, the cooking path may not comprise substantially level conveyor belts. Instead, an alternative embodiment may comprise a cooking path that spirals up or down, slopes up or down, or follows a meandering course. All of the above-described alternative embodiments may employ the method of reducing a required amount of energy to cook foodstuff by enclosing the cooking path using insulators located in close proximity to the cooking path (i.e. close to the conveyor belts). Further, all of the above-described alternative embodiments may employ the method of conserving heat and energy by ducting hot air and heat between various conveyors that are located at different vertical levels. Still further, all of the above-described alternative embodiments may employ the method of conserving heat and energy by further substantially enclosing a cooking zone within an oven zone using outer insulators. Finally, all of the above-described alternative embodiments may employ the use of IR burners to increase an effective cooking area as compared to using conventional slit-tube gas burner systems.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_1$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. The discussion of a reference in the disclosure is not an admission that it is prior art, especially any reference that has a publication date after the priority date of this application.

What is claimed is:

1. An oven, comprising:
a conveyor comprising a length and a width, the conveyor being configured to selectively move foodstuff along the length in a first direction;
an insulative duct disposed within an interior space of the oven, the duct being configured to restrict vertically upward movement of heated fluid away from the conveyor prior to the heated fluid exiting the duct in both the first direction and in a second direction that is substantially opposite the first direction; and
a burner configured to form a portion of the duct.

2. The oven according to claim 1, wherein the burner comprises an infrared burner.

3. The oven according to claim 1,
wherein the burner is configured to introduce heated fluid into the duct from vertically below the conveyor.

4. The oven according to claim 3, wherein the burner comprises an infrared burner.

5. The oven according to claim 4, further comprising:
a second burner configured to introduce heated fluid into the duct from vertically above the conveyor.

6. The oven according to claim 5, wherein the second burner forms a portion of the duct.

7. The oven according to claim 6, wherein the second burner comprises an infrared burner.

8. An oven, comprising:
an interior space;
a first duct configured to receive at least one first burner configured to introduce heated fluid into the first duct; and
a second duct configured to receive at least one second burner configured to introduce heated fluid into the second duct;
wherein opposing ends of each of the first duct and the second duct are configured to be in fluid communication with the interior space; and
wherein at least one of (1) the at least one first burner forms a portion of the first duct and (2) the at least one second burner forms a portion of the second duct.

9. The oven of claim 8, further comprising:
a first conveyor at least partially disposed in the first duct, the first conveyor being configured to selectively move foodstuff through the first duct in a first direction.

10. The oven of claim 9, further comprising:
a second conveyor at least partially disposed in the second duct, the second conveyor being configured to selectively move foodstuff through the second duct in a second direction.

11. The oven of claim 10, wherein the first direction and the second direction are substantially similar.

12. The oven of claim 10, wherein the first direction and the second direction are substantially opposite each other.

13. A method of operating an oven, comprising:
providing an oven interior space;
providing a duct within the interior space;
introducing heated fluid to the duct at a location offset from both opposing ends of the duct;
and
operating a burner that forms a portion of the duct to provide the heated fluid.

14. The method of claim 13, further comprising:
receiving heated fluid expelled from at least one of the opposing ends of the duct into the oven interior space.

15. The method of claim 13, further comprising:
providing a conveyor within the duct.

16. The method of claim 15, further comprising:
operating the conveyor to move foodstuff.

17. The method of claim 13,
wherein the burner comprises an infrared burner.

18. An oven, comprising:
a conveyor comprising a length and a width, the conveyor being configured to selectively move foodstuff along the length in a first direction;
an insulative duct disposed within an interior space of the oven, the duct being configured to restrict vertically upward movement of heated fluid away from the conveyor prior to the heated fluid exiting the duct in both the first direction and in a second direction that is substantially opposite the first direction; and
a burner configured to introduce heated fluid into the duct from vertically above the conveyor, wherein the burner forms a portion of the duct.

19. A method of operating an oven, comprising:
providing an oven interior space;
providing a duct within the interior space;
introducing heated fluid to the duct at a location offset from both opposing ends of the duct;
expelling the heated fluid from both opposing ends of the duct;
providing a conveyor within the duct;
operating the conveyor to move foodstuff in a first direction, wherein the expelling the heated fluid from both opposing ends of the duct comprises expelling the heated fluid from the duct in both the first direction and in a second direction that is substantially opposite the first direction; and
operating an infrared burner that forms a portion of the duct to provide the heated fluid.

* * * * *